United States Patent
Smith et al.

[11] Patent Number: 5,156,335
[45] Date of Patent: Oct. 20, 1992

[54] FILTERED DRINKING STRAW

[76] Inventors: Michael L. Smith, 3621 Chatham Ct., Norman, Okla. 73072; Robert E. Hodgins, 2774 Murray Drive, Victoria, British Columbia, Canada

[21] Appl. No.: 631,001

[22] Filed: Dec. 19, 1990

Related U.S. Application Data

[63] Continuation-in-part of Ser. No. 402,910, Sep. 5, 1989, abandoned.

[51] Int. Cl.$^5$ .................. B05B 17/00; B01D 35/02
[52] U.S. Cl. .................. 239/33; 210/266; 210/282
[58] Field of Search .................. 239/33; 210/266, 282

[56] References Cited

U.S. PATENT DOCUMENTS

| | | | |
|---|---|---|---|
| 32,361 | 5/1861 | Hall | 239/33 |
| 330,970 | 11/1885 | Ellis | 239/33 X |
| 580,527 | 4/1897 | Martin | 239/33 |
| 1,000,332 | 8/1911 | Dyer | 239/33 X |
| 1,001,218 | 8/1911 | Parenteau | 239/33 |
| 1,333,011 | 3/1920 | Crady | 210/266 X |
| 3,389,803 | 6/1968 | Barley | 210/266 |
| 4,298,475 | 11/1981 | Gartner | 210/266 |
| 4,642,192 | 2/1987 | Heskett | |
| 4,798,671 | 1/1989 | Mijers et al. | 210/282 X |
| 4,995,976 | 2/1991 | Vermes et al. | 210/266 |

*Primary Examiner*—Andres Kashnikow
*Assistant Examiner*—William Grant
*Attorney, Agent, or Firm*—Riches, McKenzie & Herbert

[57] ABSTRACT

A filtered drinking straw for reducing the amount of impurities in an aqueous solution and method for using same. The straw comprises a tube having a passageway containing filtering medium and plugs positioned in the tube to keep the filter medium in the straw. The plugs permit passage of the aqueous solution therethrough but not the passage of the filter medium. The plugs are retained within the tube in a force fit relation by being inserted when compressed and then released. Preferably, the plugs have increased resiliency at temperatures above room temperature, are inserted compressed when hot and cool in position to a substantially non-resilient form.

10 Claims, 2 Drawing Sheets

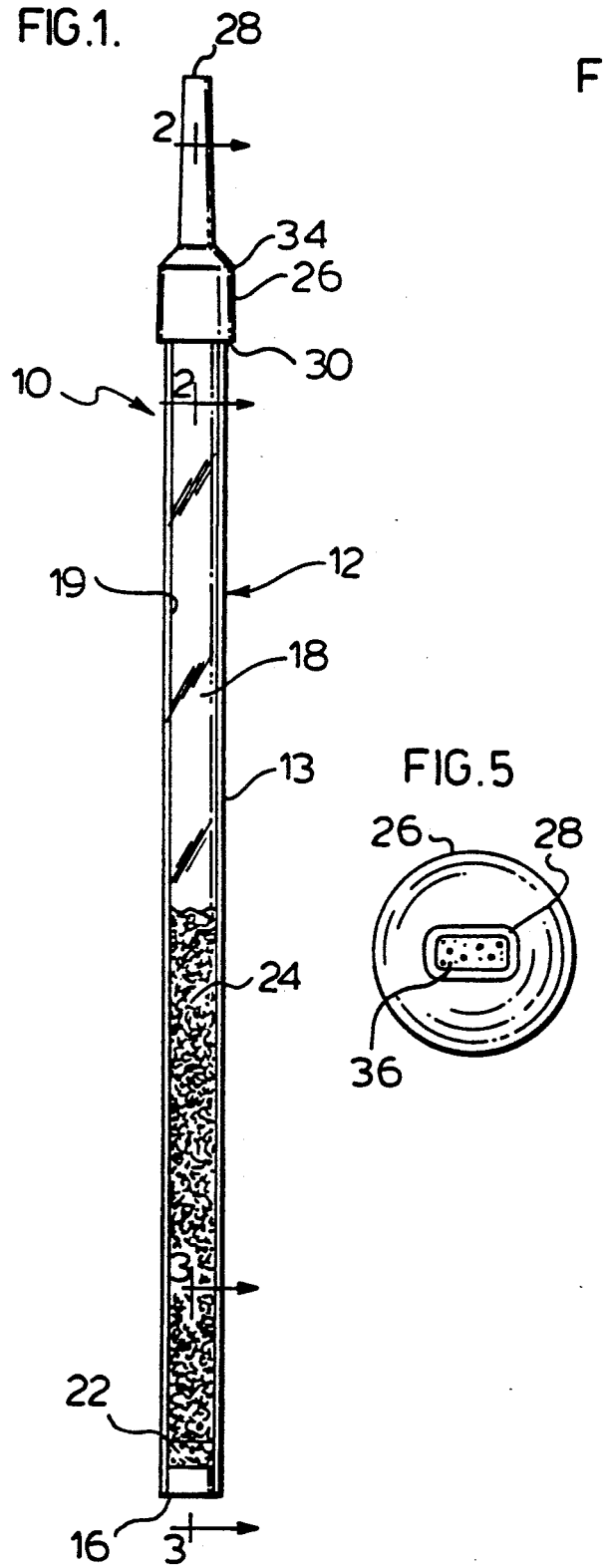
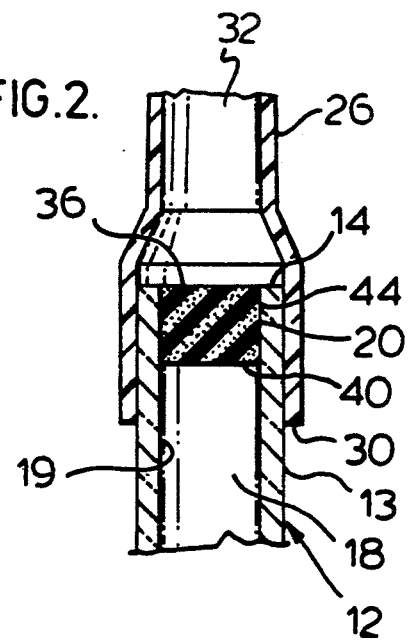
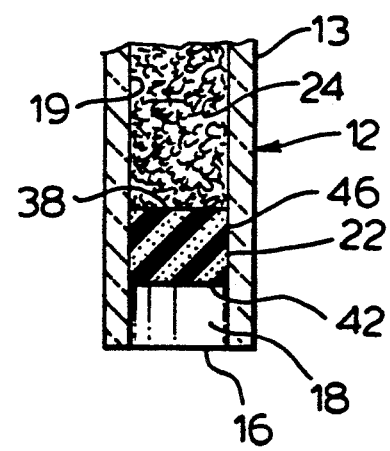
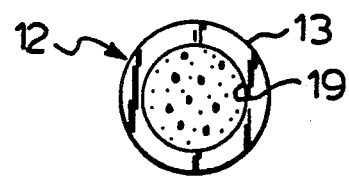

FILTERED DRINKING STRAW

This application is a continuation-in-part of copending U.S. patent application Ser. No. 07/402,910 filed Sep. 5, 1989, now abandoned.

FIELD OF THE INVENTION

The present invention relates to filtering systems for aqueous solutions and more particularly to filtering systems contained within a drinking straw.

BACKGROUND OF THE INVENTION

Portable filtering systems such as U.S. Pat. No. 4,298,475 to Gartner are known which provide an elongate tube through which water is to be drawn in the manner of a straw. Such filtering systems suffer a number of disadvantages. Firstly, they typically require very strong suction to draw water through them with the result that they are only really suitable for emergency use and cannot conveniently be used to drink fluids. Secondly, the tubes are of a relatively complex structure and are difficult to manufacture.

SUMMARY OF THE INVENTION

Accordingly, to at least partially overcome the disadvantages of the prior art, the present invention provides a drinking straw with a simplified construction in which plugs to retain filter media in the straw are retained in force fit relation within the tube.

The present invention comprises a drinking straw for filtering an aqueous solution containing impurities and delivering the filtered solution to a person's mouth. The drinking straw comprises a tube having a first end and a second end with a first passageway therethrough. The tube is sufficiently sized so that the second end of the tube contacts the aqueous solution and the first end is receivable in the person's mouth.

A sufficient amount of a filter medium is disposed in the first passageway. The filter medium is capable of permitting the passage of the solution through the first passageway while reducing the amount of impurities including bacteria in the solution that passes through the tube.

At least two plugs are positioned in the first passageway such that the filter medium is retained in a selected area of the first passageway between the plugs. The plugs are capable of permitting the passage of the aqueous solution through the plugs but will not permit the passage of the filter medium through the plugs.

The present invention also comprises a method for reducing impurities in an aqueous solution containing impurities consumed by a person. The second end of the above described drinking straw is placed in the solution and the first end is sucked to draw the solution through the tube and into the person's mouth.

BRIEF DESCRIPTION OF THE DRAWINGS

FIG. 1 is an elevational view of a first embodiment of the apparatus of the present invention.

FIG. 2 is a cross sectional view of the apparatus shown in FIG. 1, taken along lines 2—2.

FIG. 3 is a cross sectional view of the apparatus shown in FIG. 1, taken along lines 3—3.

FIG. 4 is a bottom end view of the apparatus shown in FIG. 1.

FIG. 5 is a top plan view of the apparatus shown in FIG. 1.

DETAILED DESCRIPTION OF THE PREFERRED EMBODIMENTS

Figure 6:
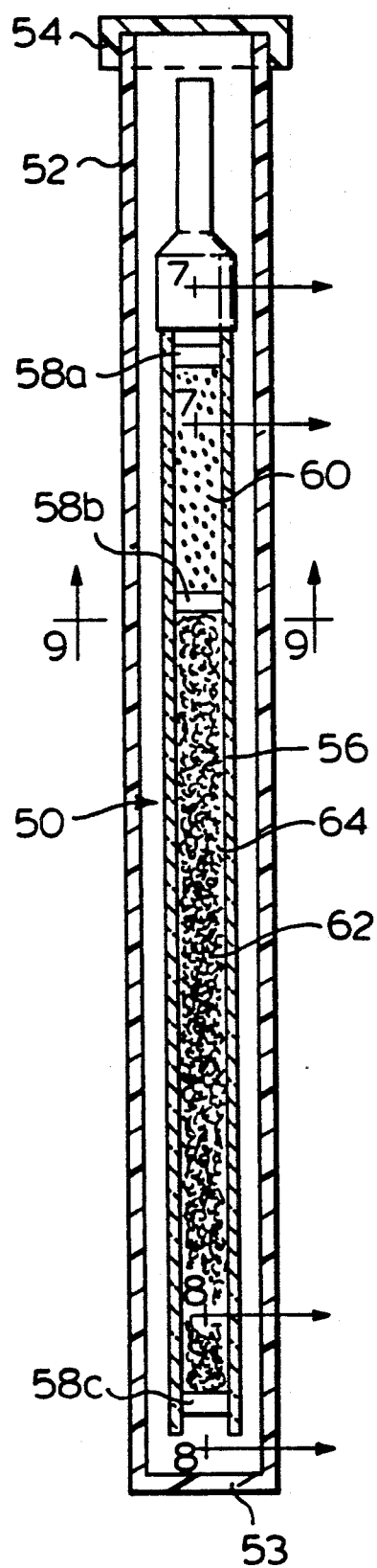
FIG. 6 is an elevational view of a second embodiment of the present invention.

Referring to the drawings in detail, and particularly FIGS. 1 and 2, the drinking straw of the first embodiment of the present generally designated by the numeral 10, comprises a tube 12 having an outer periphery 13, a first end 14 and a second end 16 with a first passageway 18 therethrough defining an interior wall 19; two plugs 20 and 22 positioned in the first passageway 18; and a filter medium 24 disposed between plugs 20 and 22.

The tube 12 may be of any length or configuration suitable for the purpose of the present invention as stated herein. Generally, a linear tube of about seven inches from the first end 14 to the second end 16 is sufficient. Another embodiment of the present invention (not shown), angles about the upper third of the tube about twenty to forty degrees in order to facilitate drinking from the straw when the straw is positioned in a glass or other container.

The tube 12 may be of any diameter suited for the purpose of the present invention. Preferably the tube 12 has a consistent diameter from the first end 14 to the second end 16. The second end 16 contacts the solution which is preferably in a container such as a glass or aluminum can. Therefore it is preferable that the second end 16 of the tube 12 is capable of fitting into a container such as the ring-top opening of an aluminum can. Preferably, the tube 12 has a consistent diameter of about 10 mm.

The tube 12 has the first passageway 18 from the first end 14 of the tube 12 to the second end 16 of the tube 12, whereby a solution received by the second end 16 of the tube may pass through the first passageway 18 to the first end 14 of the tube 12 and into the user's mouth. The first passageway 18 may be of any diameter which will permit a sufficient amount of filter medium 24 (as described hereafter) to be positioned in the first passageway 18 and permit the flow of the solution from the second end 16 of the tube 12 to the first end 14 of the tube 12 while in operation. In a preferred embodiment, a first passageway 18 diameter of about 6 mm in a 10 mm tube has been found to be sufficient.

The tube 12 may be constructed from any suitable material which can be exposed to an aqueous solution and be safe for human consumption. The tube 12 is preferably constructed from a durable material capable of retaining and not substantially interacting with the filter medium as defined hereafter. Acceptable materials for constructing the tube 12 are glass, acrylic, polycarbonate, polyethylene, polypropylene, nylon, ABS, PCV and styrene.

A preferred embodiment of the present invention is a seven inch, linear, clear acrylic tube with a 10 mm diameter having a first passageway diameter of about 6 mm.

Straw 10 includes a mouthpiece 26 having a first end 28 and a second end 30 with a second passageway 32 therethrough. The second end 30 of the mouthpiece 26 is sized to telescope over and frictionally fit on the first end 14 of the tube 12 as shown in FIG. 2. The first end 28 of the mouthpiece 26 preferably tapers inward to more comfortably fit in the user's mouth. As shown in FIG. the tapering of the mouthpiece 26 begins at a taper point 34. The distance between the second end 30 of the mouthpiece 26 and the taper point 34 is sufficient for the mouthpiece 26 to frictionally fit over and be supported by the first end 14 of the tube 12. The mouthpiece 26 may be permanently attached to the tube 12 or fit snugly enough to remain thereon unless manually removed. Alternatively, the mouthpiece 26 may be formed as a part of the tube 12.

The second passageway 32 is sized sufficiently to receive the solution from the first passageway 18 of the tube 12 without significantly impeding the flow thereof. Preferably the diameter of the second end 30 of the mouthpiece 26 is only slightly larger than the diameter of the tube 12 with the first end 28 of the mouthpiece 26 tapering slightly inward therefrom.

The mouthpiece is constructed from a material which is durable and safely compatible with aqueous solutions for human consumption, and preferably slightly flexible in order to fit more snugly over the tube 12 and be more comfortable in the mouth. In the first preferred embodiment, the distance from the first end 28 of the mouthpiece 26 to the second end 30 of the mouthpiece 26 is about 3.75 cm, with a distance from the second end 30 to the taper point 34 of 1 cm.; the diameter of the second end 30 is 12 mm; the diameter of the second passageway 32 of the second end 30 is 10 mm; and the diameter of the second passageway 32 of the first end 28 is 5 mm at its longest point.

As shown in FIGS. 2 and 3, the present invention also includes the first plug 20 and the second plug 22. Plugs 20 and 22 respectively have an upper surface 36 and 38, a lower surface 40 and 42, and an outer periphery 44 and 46.

The plugs 20 and 22 function to keep the filter medium 24, as defined hereafter, in a selected area of the first passageway 18 of the tube 12 but permit the passage of the solution therethrough. The plugs 20 and 22 may be constructed from any material or be of any size which performs the intended function as previously described and is safely compatible with an aqueous solution for human consumption. The first embodiment preferably utilizes an open cell foam material, such as polyester, having a porosity of about 80 to about 100 pores per inch.

The plugs may be secured in the first passageway 18 in any manner. Preferably the plugs 20 and 22 are, constructed from compressible material and are forced into the first passageway 18 and lodged therein. When the compression pressure is released the plugs 20 and 22 decompress, becoming lodged in the first passageway 18, thereby retaining the filter medium 24 therebetween. In a preferred embodiment using the polyester previously described, the diameter of the plugs 20 and 22 are slightly larger than the diameter of the first passageway 18, and are 5–10 mm from the upper surfaces 36 and 38 to the lower surfaces 42 and 44 respectively. Preferably the plugs 20 and 22 are positioned in the first passageway 18 respectively near the first end 14 of the tube 12 and the second end 16 of the tube 12 as shown in the drawings. This leaves a maximum selected area for the filter medium to interact with the solution.

The filter medium 24 is disposed in the first passageway 18 between the plugs 20 and 22. The filter medium 24 is capable of permitting the passage of the solution through the first passageway 18 while reducing the amount of impurities in the solution. The filter medium 24 is preferably capable of reducing the amount of certain bacteria such as $E.\ Coli$ and Pseudomonas. The filter medium 24 is also preferably capable of reducing the amount of other impurities such as chlorine, organic chemicals, iron and algae. The filter medium 24 is also preferably bacteriostatic.

There are several factors which will affect the amount of reduction of certain impurities in the solution, some of which are the quantity and rate of the solution passing though the filter medium, the quantity of the filter medium, the surface area of the filter medium, the particulate size of the filter medium, and type of impurities in the solution. Preferably the filter medium 24 reduces the amount of organic chemicals from about 10 percent to about 50 percent, reduces the amount of chlorine in the solution from about 10 percent to about 75 percent, and reduces the bacteria in the solution from about 10% to about 100%.

In a preferred embodiment, the filter medium 24 comprises zinc and copper such as the filter medium KDF ™ from ORC/KDF Technologies in Constantine, Mich., as described in their promotional literature entitled "The KDF Media" which has been submitted herewith in the Information Disclosure Statement, of patent application Ser. No. 07/402,910, and is hereby incorporated by reference. Although any of the KDF media as manufactured as of the date of the filing of this application will work in the present invention, a preferred embodiment of the present invention utilizes KDF-55D. The first embodiment is preferably used on chlorinated water since unchlorinated water may have an excessive amount of bacteria that cannot be substantially eliminated with the use of the present invention.

KDF filter media is described in U.S. Pat. No. 4,642,192 in the name of Heskett, the disclosure of which is incorporated by reference. The filter media comprises a metal having favourable redox potentials relative to the 5 redox potentials of impurities in the aqueous solution, notably chlorine, so as to establish conditions for spontaneous oxidation and reduction reactions between the impurities and the metal, thus removing the impurities. The metal is preferably chosen from aluminum, zinc, iron, steel and copper as well as mixtures and alloys thereof. Preferably, the metal is an alloy of copper and zinc.

KDF ™ is in the form of particulates of copper and zinc which range in mesh size from −10 to 100 based on U.S. Standard Screen sizes. The metal particulates exist as irregularly sized and shaped granules. KDF reduces the amount of bacteria, algae, chlorine, iron, and hydrogen sulfide in aqueous solutions.

The speed and degree of removal of the impurities is dependent, in part, upon the contact time of the aqueous solution with the filter medium. Increasing the contact surface of the filter medium will enhance the speed and degree of removal of impurities. It is therefore preferable that the maximum mesh size of the KDF or other zinc and copper filter medium is about 60, and more preferably 40 (U.S. Standard Screen).

A sufficient amount of the filtering medium 24 is disposed in the first passageway 18 which is an amount sufficient to reduce at least a portion of the impurities in the solution as defined herein. In a preferred embodiment, about 3 inches of KDF-55D having a maximum mesh size of 40 in a straw having a ¼ inch first passageway diameter has been found to be sufficient for this purpose.

In operation, the straw 10 of FIG. 1 is shaken before use to loosen the filter medium 24 and to insure maximum filtering capability. The second end 16 of the tube 12 is placed in an aqueous solution (any solution comprising water or water and at least one additive such as tea). The aqueous solution is drawn into the straw by sucking on the first end 14 of the tube 12 or the first end 28 of the mouthpiece 26. Preferably the aqueous solution is allowed to sit in the first passageway 18 for about one minute to activate the filtering medium 24. Preferably the aqueous solution is only drawn into the second end 16 of the tube 12 each time.

Reference is now made to FIG. 6 which shows a second embodiment comprising a drinking straw generally shown as 50 received in a transparent travel case indicated 51. Case 51 comprises a thin-walled cylindrical tube having a closed end 53 and a removable cover 54. The combination of the drinking straw 50 and the case 52 is useful to keep the straw 50 clean when not in use. For use, straw 50 is removed from case 52.

Straw 50 comprises an elongate tube 56 with three plugs 58 securely received therein at spaced locations to retain, in between the plugs, firstly, between plugs 58a and 58b, a carbon filter medium 60, and, secondly, between plugs 58b and 58c, a second filter medium 62.

Filter medium 62 is preferably a KDF (trade mark) type medium as discussed above. In the second embodiment, medium 62 is, however, preferably in the form of fine metal strands formed into a batting. Such strands may be spun or woven from the zinc and copper alloy. The strands preferably have a small diameter in the range of that of strands used in steel wool. The diameter of the strands is not critical. Preferred diameters are in the range of 0.001 to 0.003 inch. Use of the filter medium 62 in the form of a metal strand has the advantage of increasing the surface area of metal in contact with the fluid yet decreasing the suction required to draw fluid through the tube compared to granular material. Further, with the use of the medium 62 as a strand, any tendency of the granular material to develop channels, which reduces liquid contact with the granular material, is avoided.

Filter medium 60 comprises granular, activated carbon to deodorize and absorb impurities, especially organic matter including nitrates. Preferably, the carbon is acid washed to remove acid soluable ash from the carbon. One preferred carbon is sold by Barnebey Sutcliffe Corp. under the trade name Activated Carbon Type SK and is preferably used in granular size 20×50 US Screen ASTM D-2862.

Tube 56 is a thin-walled cylindrical tube of plastic material, preferably ABS plastic, having a wall thickness in the range of about 0.10 to 0.010 inches, more preferably about 0.025 inches. ABS is strong and thus permits a thin yet relatively rigid wall. Provision of a thin wall is useful so as to maximize the diameter of the internal passageway 64 through the tube yet keeping the outside diameter of the tube sufficiently small to approximate that of a normal straw and permit use with sport and hospital type water bottles and other containers having small openings for straws. Providing the tube to be of a thin-walled material is advantageous to maximize the passage size which reduces the suction pressure necessary to efficiently draw water through the straw. The ABS should be food grade as, for example, U.S. FDA approved.

ABS plastic also has the advantage of being electroplatable so the tube can be provided with a thin, electroplated decorative metal layer over the exterior of the tube.

Plugs 58 in the second embodiment comprise a micro filter through which small particles cannot pass. The plugs are of an open-celled thermoplastic material selected to have pore openings sufficiently small to physically filter suspended particles. Preferably, the plugs comprise polyolefin plastics such as polyethylene and polypropylene which are sintered so as to provide an open cell pore structure preferably with a pore size in the range of 50 to 200 microns.

Figure 7:
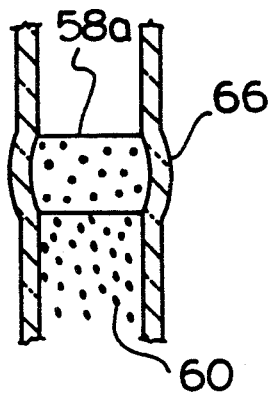
FIG. 7 is a cross-sectional view of the apparatus of FIG. 6 along line 7—7.
Figure 9:
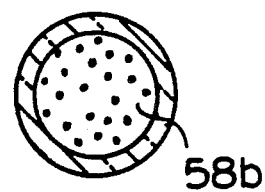
FIG. 9 is a cross-sectional view of the apparatus of FIG. 6 along line 9—9.
Figure 8:
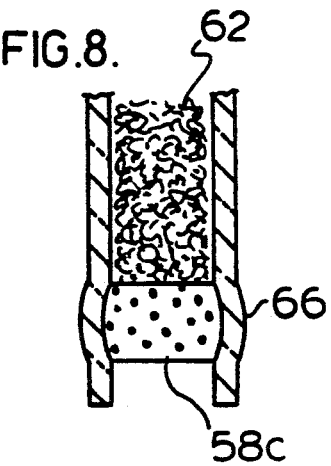
FIG. 8 is a cross-sectional view of the apparatus of FIG. 6 along line 8—8.

The plugs 58 of the material are preferably made of a plastic selected so as to have relatively low resiliency at normal room temperatures but resilient and compressible at temperatures above room temperature. With such plugs, the plugs may be compressed when at an elevated temperature, for example, at about 100° F. and then inserted into the tube and released while still hot. The hot plugs expand outwardly into a forced-fit relation in the tube. On cooling, the plug is effectively locked in place in the tube. The plug should be carefully sized having a regard to the extent to which they will expand and the strength and size of the tube. Preferably, when a thin-walled ABS tube is used, the plug will be sized so as to marginally expand the tube wall radially outwardly as shown at 66 in FIGS. 7 and 8 and thus ensure the cooled plug is locked in place in the tube. The plugs can thus provide a stable, relatively rigid filter secured in place in the tube.

Plugs have been formed and inserted by a process of using a thin-walled circular die to stamp a circular disc from a ⅛ inch thick sheet of the plastic material while the material is hot. The die is formed so as to compress the plug as the die stamps the plug from the sheet material. The compressed circular plug is retained in a compressed state hot within the die. The circular die has thin walls and its outer diameter is marginally less than the inside diameter of the tube. The die with the heated plug inside it is inserted into the tube to a desired distance from an end of the tube and then a plunger is used to push the compressed, hot plug axially out of the die whereby the hot plug expands into frictional engagement with the tube at a desired location. Of course, alternatively, plugs of desired thickness and size could be preformed, later heated and then inserted into the tube in a compressed heated state.

The second embodiment filters out suspended particles via means of each of the three plugs 58. Filter medium 62 filters out chlorine, lead, mercury, aluminum, arsenic, cadmium, chromium, barium, hydrogen, sulphine and other impurities such as algae, fungus, scale and sediment.

To filter out fluoride, the second embodiment may have bone ash or bone meal added to the carbon filter medium. Alternately, to filter out fluoride, a layer of $AlO_2$ may be provided below the bottom plug 58c. For example, a fourth plug may be provided and the $AlO_2$ could be disposed as a powder between the third and the fourth plug below the filtered medium 62. Any $AlO_2$ which may pass through the plug 58c would be filtered out by the filter medium 62. Rather than provide a fourth plug, a preferred method of incorporating granular material or powder in the tube in small amounts is to incorporate the granular material or powder into the bottom plug 58c at the time it is being formed. Up to about 10% preferably 5% by volume of the plastic plug can comprise a granular and/or powdered material which is ingrained within the opened cell during its formation and is substantially trapped therein against removal. Thus, a sprinkling of $AlO_2$ powder may be provided in the bottom plug 58c captured in the plug and thus serve the function of additionally removing fluoride from any fluid.

The straw of the second embodiment is particularly adapted to filter out chlorine and metals from treated water such as available from taps in cities in North America. However, the straw is useful to treat almost any water which contains chlorine, such as untreated water to which chlorine tablets have been added for treatment.

While the invention has been described with reference to a preferred embodiment, the invention is not so limited. Many modifications and variations will now occur to persons skilled in the art. For definition of the invention, reference is made to the appended claims.

We claim:

1. A drinking straw for filtering an aqueous solution containing impurities and delivering the filtered solution to a person's mouth, comprising:
   a tube having a first end and a second end with a first passageway therethrough, wherein the tube is sufficiently sized so that the second end contacts the aqueous solution and the first end is receivable in the person's mouth;
   filter medium disposed in the first passageway capable of permitting the passage of the solution through the first passageway while reducing the amount of impurities in the aqueous solution that passes through the tube; and
   at least two plugs positioned in the first passageway such that the filter medium is retained in a selected area of the first passageway between the plugs, wherein the plugs are capable of permitting the passage of the aqueous solution through the plugs but will not permit the passage of the filter medium through the plugs,
   the plugs being fixed in the passageway in a friction fit relation by the plugs having been inserted into the passageway in a resilient but compressed condition and on release expanding into said friction fit relation,
   wherein the plugs have increased resiliency at temperatures above room temperature, each plug being inserted into the passageway while the plug is at a temperature when it has increased resiliency,
   the plugs being substantially uncompressible at room temperature, and
   the tube being deformed outwardly locally about each plug on the plug expanding.

2. The drinking straw of claim 1 wherein the plugs comprise an open cell thermoplastic material having sufficiently small pores therethrough to prevent suspended solids from passing therethrough.

3. A drinking straw as claimed in claim 2 wherein three plugs are provided at spaced locations,
   a first filter media being provided between the two plugs closest the first end, and a second filter media being provided between the two plugs closest the second end,
   the first filter media comprising activated carbon,
   the second filter media comprising a metal having a redox potential relative to the redox potential of chlorine in the aqueous solution so as to establish spontaneous oxidation and reduction reactions between the metal and said chlorine.

4. A straw as claimed in claim 3 wherein said metal is in the form of a batting of fine wire.

5. A straw as claimed in claim 4 wherein said metal comprises an alloy of copper and zinc.

6. A straw as claimed in claim 5 further including active $AlO_2$ for removal of fluorine ions from the aqueous solution, said $AlO_2$ retained within the plug closest the second end by impregnating the plug with up to 5% by volume $AlO_2$ during manufacture of the plug.

7. A straw as claimed in claim 5 wherein said tube comprises ABS plastic.

8. The drinking straw of claim 1 wherein the plugs comprise sintered, open cell polyolefin material.

9. The drinking straw of claim 1 wherein the plugs comprise sintered polyethylene having a pore size in the range of 50 to 200 microns.

10. A drinking straw for filtering an aqueous solution containing impurities, comprising:
    a thin hollow tube having a first end receivable in a person's mouth and a second end, and having a passageway within said tube between the first end and the second end,
    at least three plugs positioned within the passageway at spaced locations,
    a first filter media disposed between the two plugs nearest the first end, and a second filter media disposed between the two plugs closest the second end,
    the first filter media comprising activated carbon,
    the second filter media comprising an alloy of copper and zinc having a redox potential relative to the redox potential of chlorine to remove chlorine impurities from the aqueous solution,
    the alloy being in the form of a batting of fine wire presenting a large surface area of the alloy into contact with the aqueous solution,
    said plugs comprising a sintered, open cell polyolefin fixed in the passageway in a friction fit realtion by the plugs having been inserted into the passageway in a resilient but compressed condition and on release expanded into said friction fit relation,
    wherein the plugs have increased resiliency at temperatures above room temperature, each plug being inserted into the passageway while the plug is at a temperature when it has increased resiliency,
    the plugs being substantially uncompressible at room temperature, and
    the tube being deformed outwardly locally about each plug on the plug expanding.

* * * * *